United States Patent [19]

Hegger

[11] 4,343,140
[45] Aug. 10, 1982

[54] SUGAR-CANE HARVESTER

[75] Inventor: Josef Hegger, Harsewinkel, Fed. Rep. of Germany

[73] Assignee: Claas OHG, Harsewinkel, Fed. Rep. of Germany

[21] Appl. No.: 226,153

[22] Filed: Jan. 19, 1981

[51] Int. Cl.³ .................................................. A01D 35/12
[52] U.S. Cl. .................................. 56/17.1; 56/DIG. 15; 56/10.4
[58] Field of Search .................. 56/13.9, 13.8, 10.2, 56/DIG. 15, 10.4, 17.1, 17.2

[56] References Cited

U.S. PATENT DOCUMENTS

| | | | |
|---|---|---|---|
| 3,137,984 | 6/1964 | Shonkniler | 56/DIG. 15 |
| 3,509,701 | 5/1970 | Clarke | 56/DIG. 15 |
| 3,597,907 | 8/1971 | Neal | 56/DIG. 15 |
| 4,147,016 | 4/1979 | Jensen et al. | 56/10.4 |
| 4,170,098 | 10/1979 | Moreno et al. | 56/17.2 |

FOREIGN PATENT DOCUMENTS 2654141 1/1978 Fed. Rep. of Germany .... 56/DIG. 15

Primary Examiner—Robert A. Hafer
Attorney, Agent, or Firm—Michael J. Striker

[57] ABSTRACT

A sugar-cane harvester having a frame and a cutter unit is provided with means for adjusting a vertically swingable cutter unit having a skid engaging the ground in its traveling path over uneven ground. This means includes a double-acting hydraulic piston-cylinder unit and a spring whose force counteracts the major part of the weight of the cutter unit. The piston of the hydraulic unit is connected to the cutter unit whereas its cylinder is connected to the frame of the harvester. The adjusting assembly further includes a slide adapted to selectively supply with a working fluid each of two opposite ends of the cylinder chamber, and a pair of electro-magnetic valves actuating the movement of the slide in two opposite directions in response to any inclined position of the cutter unit in its travelling path over uneven ground.

14 Claims, 2 Drawing Figures

SUGAR-CANE HARVESTER

BACKGROUND OF THE INVENTION

The invention relates to sugar-cane harvesters, and more particular to means for adjusting the movement of the harvester cutter in its travelling path over the ground.

In the constructions of sugar-cane harvesters known in the art the major part of the weight of the swingable cutter unit is counteracted by a relatively strong spring whereas the remaining part of this weight is merely transmitted to a skid travelling in contact with the ground. The advantage of such constructions is that the movement of the skid over uneven ground may be adjusted so as to prevent the skid from getting stuck in the soil when the skid meets raised portions during travelling of the harvester. It has been however, found that such adjustment is possible only within certain limits, that is, due to certain characteristics of the springs to be used in such arrangements, the springs are not able to maintain the weight at which the skid has to rest on the ground constant over relatively large area of swinging movement of the unit.

SUMMARY OF THE INVENTION

It is an object of the invention to provide an improved sugar-cane harvester.

Another object of the invention is to provide a sugar-cane harvester with an improved adjusting arrangement by which the skid of the cutter unit is prevented from getting stuck in the ground during travelling of the harvester.

Still another object of the invention is to improve operating conditions for the skid of the cutter unit by distributing the weight of the cutter unit over a larger area of the harvester frame.

These and other objects of the invention are attained by a self-propelled sugar-cane harvester, comprising a frame, a cutter unit vertically swingably mounted on said frame, said cutter unit including a skid adapted to engage the ground in the travelling path of the harvester; spring-biasing means mounted between said frame and said cutter unit and adapted to counteract the major portion of the weight of said unit; and adjusting means for regulating the movement of said unit relative to the ground when said skid meets raised portions and depressions in said travelling path, said adjusting means being operatively interconnected with said spring-biasing means and with said cutter unit to thereby provide for relatively smooth travelling of the harvester over uneven ground. The cutter unit has a longitudinal axis, said adjusting means being adapted to automatically regulate the movement of said unit in dependence upon each inclined position of said cutter unit relative to said longitudinal axis when said skid engages uneven ground.

The harvester may include a supporting pin rigidly mounted on said frame, said cutter unit being vertically swingably supported on said pin.

The harvester may further comprise manually-operated means for controlling said movement of said cutter unit relative to the ground. Besides the automatic cycle of adjusting of the movement of the cutter unit manually-operated means may be provided to regulate the vertical skid travelling over the uneven ground.

The automatic adjusting means may include a double-acting piston-cylinder unit having a piston operatively connected to said unit and a cylinder operatively connected to said frame.

Said adjusting means may further include a first supporting plate having a bore to receive said cylinder and a second supporting plate also receiving said cylinder and rigidly connected hereto.

The first supporting plate may be spaced from the second supporting plate along the length of said cylinder to form a space therebetween, said spring-biasing means including a compression spring located in said space. The adjusting means may further include a base plate further spaced from said second supporting plate along the length of said cylinder, said base plate being secured to said frame.

A number of longitudinal rods may be provided in the harvester, said rods interconnecting said first supporting plate, said second supporting plate and said base plate. The second supporting plate and the base plate may be formed with through-passing bores adapted to receive said longitudinal rods, said rods being rigidly connected to said first supporting plate.

The adjusting means may further comprise a control slide element operatively connected to two opposite ends of said double-acting piston-cylinder unit and two electromagnetic valves, said electromagnetic valves being adapted to selectively actuate said slide element for regulating the movement of the piston in response to a respective inclined position of the cutter unit.

The harvester may include a switch operatively connected to said second supporting plate and electrically connected to said electromagnetic valves, said switch being adapted to selectively energize said electromagnetic valves in response to a certain position of said second supporting plate.

The slide element may be connected to said two opposite ends by two respective conduits to supply working fluid into the cylinder.

A working fluid supply tank may provided which is connected to the slide element.

The manually-operated means may be electrically connected to said electromagnetic valves and may include a hydraulically-operated control valve and a handle.

The control arrangement may include a first circuit-breaking switch electrically connected to said electromagnetic valves and a linkage, said linkage being interconnected between said first circuit-breaking switch and said hydraulically-operated control valve, a second circuit-breaking switch electrically connected to said first circuit-breaking switch, and a connecting rod mounted on said cutter unit by its one end and adapted to selectively open or close said second circuit-breaking switch by its other end.

By provision of automatic and manually-operated adjusting means any sloped position of the cutter unit upon meeting an obstacle in its travelling path will be immediately adjusted and the smooth travelling of the skid over the uneven ground will be obtained.

The novel features which are considered as characteristic for the invention are set forth in particular in the appended claims.

DETAILED DESCRIPTION OF THE PREFERRED EMBODIMENT

Figure 1:
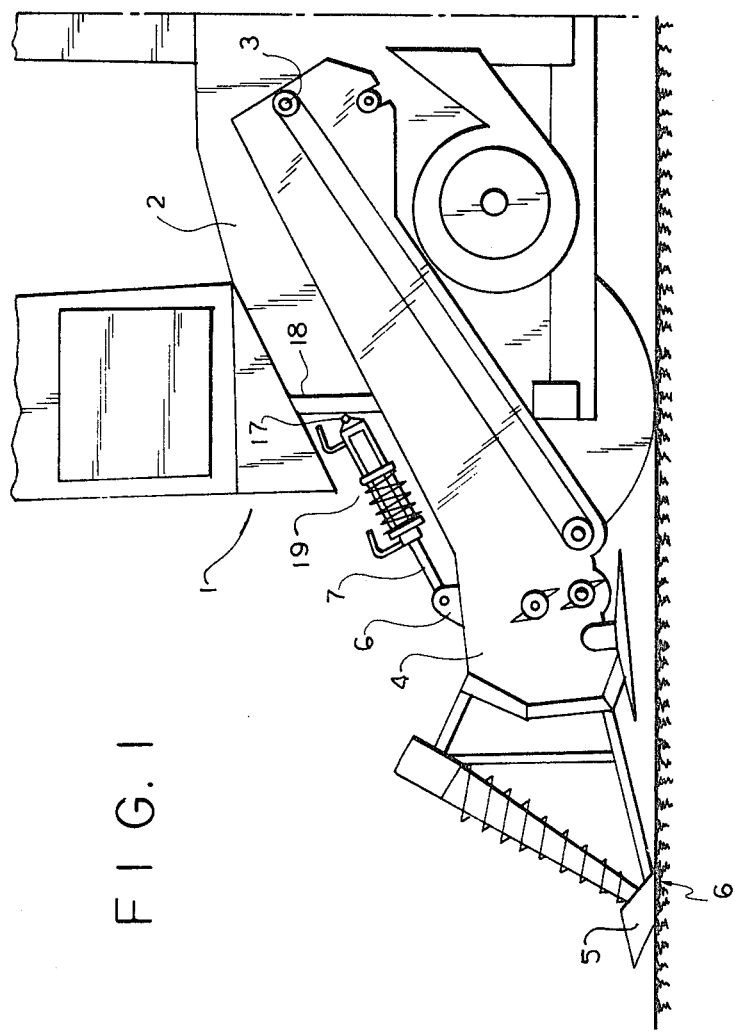
FIG. 1 is a partial side view of a sugar-cane harvester according to the invention.

In the drawings, the reference numeral 1 designates in toto a front part of a sugar-cane harvester. A supporting pin 3 is mounted on side walls 2 of the harvester. A swingable cutter unit 4 is mounted on the pin 3 so that the unit may swing upwardly and downwardly with respect to the ground. The cutter unit 4 is terminated with a skid 5 which engages the ground when the harvester travels in its operation. Since the cutter unit 4 is rather heavy the skid may easily get stuck in the soil. In order to prevent this the harvester is provided with a hydraulic piston-cylinder unit 19 which is positioned between the cutter unit 4 and a frame 18 of the harvester. The cutter unit 4 has a bearing lug 6' welded thereto and connected to a movable piston 7 of the hydraulic piston-cylinder-unit 19. As can be clearly seen in FIG. 2, a cylinder 8 of the unit 19 at one end thereof is loosely guided through a bore 9 formed in a first supporting plate 10. The plate 10 has an end face 10' supporting one end of a compression spring 11 the other end of which bears against a face 12' of a second supporting plate 12 which is opposite to the plate 10. The plate 12 is also provided with a bore to receive the cylinder 8 but is rigidly connected to this cylinder. The plate 12 is formed with two through-passing bores 13 adapted to receive two rods 14 which are connected to the supporting plate 10 at their one ends, pass through bores 13 and are connected to a base plate 16 at their other ends, for example by means of bolts 16'. The base plate 16 carries a lug 15 which is by means of bolts 17 connected to the frame 18 provided with a non-illustrated bearing support welded thereto which serves to connect the lug 15 of the base plate 16 to the front part of the sugar-cane harvester.

The major part of the weight of the cutter unit 4 connected to the frame 18 is transmitted to the spring 11 whose force counteracts this part of the weight, so that the skid 5 engaging the ground counteracts only a relatively small part of this weight.

Figure 2:
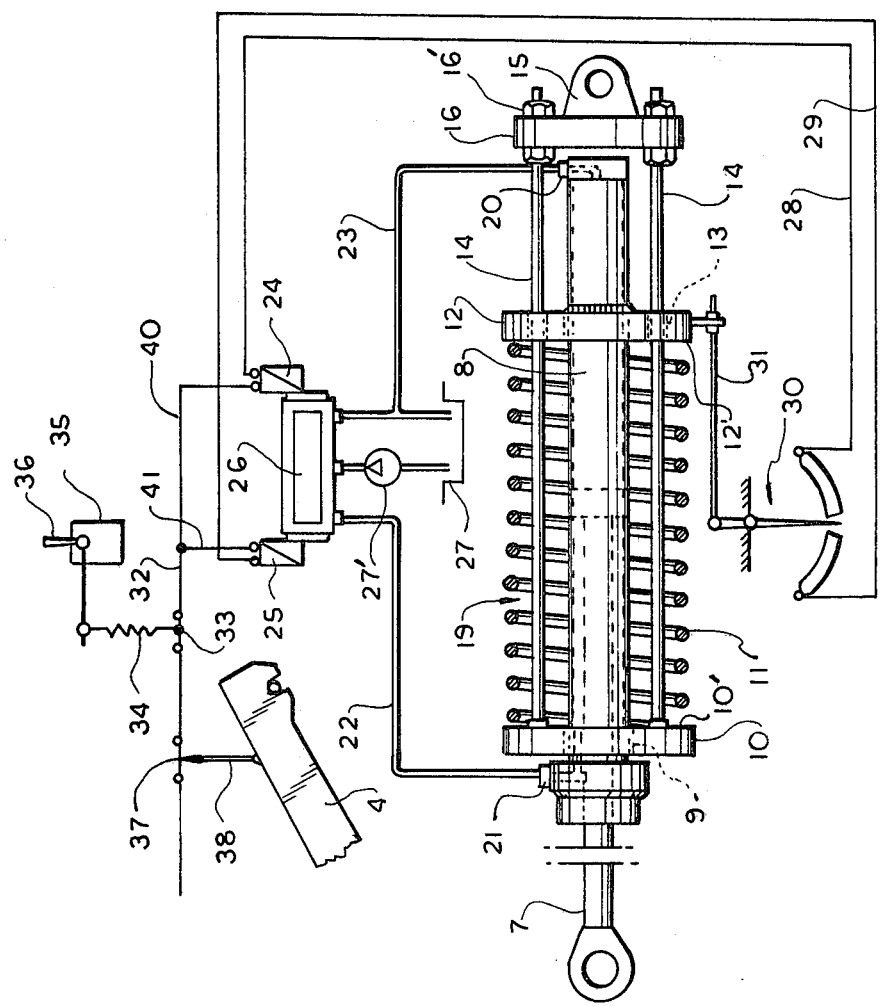
FIG. 2 is a side view of a piston-cylinder unit at an enlarged scale in combination with a schematical view of a control device according to the invention.

As can be clearly seen in FIG. 2, the hydraulic piston-cylinder unit 19 is double-acting. The chamber of the cylinder 8 is connected with two oil conduits 20 and 21 at both ends thereof. The conduits 20 and 21 are in turn communicated with conduits 22 and 23. The end portions of the conduits 22 and 23 are connected to a control slide element 26 actuated by a pair of electromagnetic valves 24 and 25. The control slide element 26 is in a conventional mode connected to an oil tank 27 via a pump 27' and an oil feeding and oil discharging conduits communicated with the oil tank 27.

A pair of electrical conductors 28 and 29 lead from the electromagnetic valves 24 and 25, respectively to a switch 30 having a switching rod 31 connected to the supporting plate 12. Depending on a position of the plate 12 either of the circuits 28 or 29 will be closed and the respective electromagnetic valve 24 or 25 be energized. In response to such energization a slide of the slide element 26 will move in the known mode and control the respective oil flows in the conduits 21 and 23 and thereby regulate the movement of the piston 7. Such regulation is required particularly when the harvester meets a sudden depression or raised portion in its travel over the ground 6. When the skid 5 engaging the ground meets a sudden depression the skid will not contact the ground. When the skid 5 meets a sudden raised portion it may get stuck in the soil. In order to prevent these undesirable results of the harvester travelling over uneven ground the cutter unit 4 is provided with the above-described control device which automatically raises and lowers the entire cutter unit 4 in dependence on the obstacle that the harvester meets. Besides such automatic adjustment it is possible to switch over to a manually-operated adjustment of the height of the unity. For this purpose the present device is provided with a switch 33 which is electrically connected to the electromagnetic valves 24 and 25 by means of conductors 40 and 41. The switch 33 is communicated with a linkage 34 which in turn is connected to a hydraulically-operating control valve 35. The valve 35 is manually operated and provided with a handle 36 which may be lifted or lowered by an operator. The switch 33 which is opened or closed in dependence on the position of the handle 36 and linkage 34 operatively connected thereto via the valve 35 controls the oil flows in the conduits 20 and 21 through the valves 24, 25 and thus regulates the movement of the piston 7. The switch 33 is electrically connected to a switch 37 which is closed or opened by a lever 38 which in turn is connected to the frame of the cutter unit 4. The valve 35 is so constructed that the switch 33 is closed immediately after release of the handle 36 which returns into its neutral position by force of a spring. If, during the travel of the harvester over a road or the like the unit 4 has to be raised and remain in the raised position, this is accomplished by actuating the valve 35 in such a manner until also the switch 37 is opened by the lever 38. If the handle 36 is then released the switch 33 is thereby closed whereas the switch 37 is still open, so that the current in line 40 is still interrupted causing the cutter unit to remain in the lifted position unless an operator lowers the handle 36 and closes the switch 37 via the lever 38 thus regulating the oil flows in the conduits 20 and 21 in the manner described above for the automatic adjustment.

It is to be understood that the automatical device functions all the time during the travelling of the sugar-cane harvester however this adjusting function may be interrupted when desired by the manually-operated adjusting arrangement.

It will be understood that each of the elements described above, or two or more together, may also find a useful application in other types of sugar-cane harvester differing from the types described above.

While the invention has been illustrated and described as embodied in harvesters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-propelled sugar-cane harvester, comprising a frame; a supporting pin mounted on said frame; a cutter unit vertically swingably supported on said pin;

said cutter unit having a longitudinal axis and including a skid adapted to engage the ground in the travelling path of the harvester; spring-biasing means mounted between said frame and said cutter unit and adapted to counteract the major portion of the weight of said unit; adjusting means for regulating the movement of said unit relative to the ground when said skid meets raised portions and depressions in said travelling path, said adjusting means including a double-acting piston-cylinder unit having a piston operatively connected to said cutter unit and a cylinder operatively connected to said frame, a first supporting plate having a bore to receive said cylinder, and a second supporting plate also receiving said cylinder and rigidly connected thereto, said first supporting plate being spaced from said second supporting plate along the length of said cylinder to form a space therebetween, said spring-biasing means including a compression spring located in said space, said adjusting means being adapted to automatically regulate the movement of said unit in dependence upon each inclined position of said cutter unit relative to said longitudinal axis when said skid engages uneven ground and to provide for relatively smooth travelling of the harvester over uneven ground; and manually-operated means for controlling said movement of said cutter unit relative to the ground.

2. The harvester of claim 1, further including a base plate further spaced from said second supporting plate along the length of said cylinder, said base plate being secured to said frame.

3. The harvester of claim 2, wherein longitudinal rods are provided, said rods interconnecting said first supporting plate, said second supporting plate and said base plate.

4. The harvester of claim 3, wherein said second supporting plate and said base plate each are formed with a through passing bore adapted to receive said longitudinal rods, said rods being rigidly connected to said first supporting plate.

5. The harvester of claim 4, wherein said adjusting means further comprise a control slide element operatively connected to two opposite ends of said double-acting piston-cylinder unit and two electromagnetic valves, said electromagnetic valves being adapted to selectively actuate said slide element for regulating the movement of said piston in response to a respective inclined position of said cutter unit.

6. The harvester of claim 5, further including a switch operatively connected to said second supporting plate and electrically connected to said electromagnetic valves, said switch being adapted to selectively energize said electromagnetic valves in response to a position of said second supporting plate.

7. The harvester of claim 6, wherein said slide element is connected to said two opposite ends by two respective conduits to supply working fluid into said cylinder.

8. The harvester of claim 7, wherein a working fluid supply tank is provided and connected to said slide element.

9. The harvester of claim 8, wherein said manually-operated means are electrically connected to said electromagnetic valves.

10. The harvester of claim 9, wherein said manually-operated means include a hydraulically-operated control valve and a handle.

11. The harvester of claim 10, including a first circuit-breaking switch electrically connected to said electromagnetic valves, and a linkage, said linkage being interconnected between said first-breaking switch and said hydraulically-operated control valve.

12. The harvester of claim 11, further comprising a second circuit-breaking switch electrically connected to said first circuit-breaking switch, and a connecting rod mounted on said cutter unit by its one end and adapted to selectively open or close said second circuit-breaking switch by its other end.

13. A self-propelled sugar-cane harvester comprising a frame; a supporting pin mounted on said frame; a cutter unit vertically swingably supported on said pin, said cutter unit having a longitudinal axis and including a skid adapted to engage the ground in the travelling path of the harvester; spring-biasing means mounted between said frame and said cutter unit and adapted to counteract the major portion of the weight of said unit; and adjusting means for regulating the movement of said unit relative to the ground when said skid meets raised portions and depressions in said travelling path, said adjusting means including a double-acting piston-cylinder unit having a piston operatively connected to said unit and a cylinder operatively connected to said frame, a first supporting plate having a bore to receive said cylinder, a second supporting plate also receiving said cylinder and rigidly connected thereto, said first supporting plate being spaced from said second supporting plate along the length of said cylinder to form a space therebetween, said spring-biasing means including a compression spring located in said space, a base plate further spaced from said second supporting plate along the length of the cylinder, said base plate being secured to said frame, and longitudinal rods interconnecting said first supporting plate, said second supporting plate, and said base plate to each other.

14. The harvester of claim 13, further including manually-operated means for controlling said movement of said cutter relative to the ground.

* * * * *